United States Patent
McCoskey et al.

(10) Patent No.: US 6,460,108 B1
(45) Date of Patent: Oct. 1, 2002

(54) LOW COST DATA STREAMING MECHANISM

(75) Inventors: Jeff J. McCoskey; Richard P. Mackey, both of Phoenix, AZ (US); Barry R. Davis, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/282,386

(22) Filed: Mar. 31, 1999

(51) Int. Cl.⁷ ............................................. G06F 13/00
(52) U.S. Cl. ..................... 710/310; 710/57; 710/305; 710/306; 710/307
(58) Field of Search .................... 710/129, 52, 53, 710/57, 130, 127, 128, 305, 306, 307, 310, 311, 313, 315

(56) References Cited

U.S. PATENT DOCUMENTS

| | | | | |
|---|---|---|---|---|
| 5,295,246 A | * | 3/1994 | Bischoff et al. ............... | 710/34 |
| 5,339,413 A | * | 8/1994 | Koval et al. ................. | 709/300 |
| 5,377,325 A | * | 12/1994 | Chan .......................... | 710/29 |
| 5,423,021 A | * | 6/1995 | Thome et al. ............... | 711/211 |
| 5,481,681 A | * | 1/1996 | Gallo et al. .................. | 710/113 |
| 5,487,167 A | * | 1/1996 | Dinailo et al. .............. | 395/807 |
| 5,499,344 A | * | 3/1996 | Elnashar et al. ............ | 710/310 |
| 5,524,270 A | * | 6/1996 | Haess et al. ................. | 375/354 |
| 5,535,341 A | * | 7/1996 | Shah et al. .................. | 710/126 |
| 5,634,099 A | * | 5/1997 | Andrews et al. ............ | 709/212 |
| 5,664,117 A | * | 9/1997 | Shah et al. .................. | 710/100 |
| 5,694,556 A |   | 12/1997 | Neal et al. .................. | 395/308 |
| 5,761,450 A | * | 6/1998 | Shah .......................... | 710/107 |
| 5,761,464 A | * | 6/1998 | Hopkins ..................... | 710/130 |
| 5,771,356 A | * | 6/1998 | Leger et al. ................. | 709/231 |
| 5,832,245 A | * | 11/1998 | Gulick ........................ | 710/105 |
| 5,857,085 A | * | 1/1999 | Zhang et al. ............... | 395/309 |
| 5,978,868 A | * | 11/1999 | Maas .......................... | 709/234 |
| 6,026,455 A | * | 2/2000 | Shah et al. .................. | 710/100 |
| 6,047,339 A |   | 4/2000 | Su et al. ...................... | 710/56 |
| 6,070,209 A |   | 5/2000 | Hausauer .................... | 710/104 |
| 6,108,741 A |   | 8/2000 | MacLaren et al. .......... | 710/128 |
| 6,115,551 A | * | 9/2000 | Chao .......................... | 395/882 |
| 6,155,760 A | * | 9/2000 | Lo et al. ...................... | 710/52 |

\* cited by examiner

*Primary Examiner*—Xuan M. Thai
(74) *Attorney, Agent, or Firm*—Blakely, Sokoloff, Taylor & Zafman LLP (57) ABSTRACT

A method and apparatus for providing an efficient, low cost data streaming mechanism from a first bus architecture to a second bus architecture across a bus bridge. Separate read and write data queues are provided in the bus bridge for transfer of data in both directions, and the speed of one of the buses is increased over the speed of the other one of the buses. In one embodiment, the first bus is a PCI bus and the second bus is an internal CPU bus.

39 Claims, 5 Drawing Sheets

| BUS 150 | IWQ 114 | BUS 140 |
|---|---|---|
| 1. Write begins (streaming) |  | 1. Data starts draining faster than BUS 150 can fill IWQ. |
| 2. Write continues (streaming) |  | 2. Write empties IWQ; transaction terminates on BIS 140. |
| 3. Write continues (streaming) |  | 3. Write transaction restarts when IWQ hits HWM. |
| 4. Write ends |  | 4. Write transaction continues until IWQ is empty. |

*FIG. 3*

| BUS 150 | IRQ 116 | BUS 140 |
|---|---|---|
| 1. Read initiated, gets retried |  | 1. Read starts filling IRQ. |
| 2. Read returns; starts draining IRQ (streaming) |  | 2. Read continues filling faster than BUS 150 can drain. |
| 3. Read continues |  | 3. Read fills IRQ; terminates on BUS 140. |
| 4. Read continues |  | |
| 5. Read terminated on empty IRQ; retry if want more data |  | |

LOW COST DATA STREAMING MECHANISM

BACKGROUND OF THE INVENTION

1. Field of the Invention

The present invention relates generally to computer systems, and specifically, to a method and apparatus for providing a low-cost, efficient data streaming mechanism between two buses.

2. Background Information

In computer systems, bus bridges are typically used to separate a first bus from a second bus. This isolates transactions on the first bus from affecting transactions on the second bus, and vise versa. Moreover, the physical characteristics of a bus place a limit on the number of devices (or agents) that may be attached to it. Accordingly, many computer systems implement multiple-bus architectures having a number of physically separate buses to further expand functionality. The buses may be the same bus (protocol) or may be of different protocols. Thus, the bus bridge also interfaces one bus protocol to another, thereby allowing agents on the different buses to communicate.

A bus bridge that couples two buses together is typically transparent so that the physically separate buses may be treated by an agent and the system as on bus. To accomplish such a result, an address space is shared by agents on each bus. Read and write requests bearing an address range within the shared address space are generated by an initiator agent on an initiating bus. The bridge recognizes the address range and forwards the request to a target agent on a target bus. Thus, the bridge acts as the initiator on the target bus for the initiator agent on the initiating bus.

There is a myriad of bus and bridge architectures in the current state of computer technology. An example of a modern, computer bus is the Peripheral Components Interconnect (PCI) bus. The PCI bus is an industry standard, high performance, low latency system bus, generally defined by the PCI Special Interest Group (SIG) in PCI Local Bus Specification, Revision 2.1, Oct. 21, 1994. The PCI SIG also maintains a bridge architecture described in PCI-to-PCI Bridge Architecture Specification, Revision 1.0, Apr. 5, 1994.

Transactions are defined here as complete transfers of data between an initiator and a target, where the initiator and target are on different physical buses coupled by a bridge. When forwarding data from one bus to another, bridges typically implement data queues to hide the delay associated with requesting and obtaining access to the target bus for obtaining or forwarding the data. Each transaction is typically assigned a logical queue which is released when the transaction is completed.

The queue will typically be part of a memory or buffer that implements a First-In-First-Out ("FIFO") data structure. The FIFO is a data structure from which items are taken out in the same order they were put in. Typically, the FIFO may be written to and read from simultaneously.

A transaction as defined herein involves a request from an initiator to read from or write to a given address range which is claimed by a target. If the request is accepted by the bridge, the transaction begins and an appropriate access is started. An access typically includes an idle phase for setup, an address phase during which address information for the particular request is exchanged, and a data phase during which data is exchanged.

Alternatively, the request may be denied by the bridge. In that case, the bridge issues a termination known as a retry signal to the initiator. This may occur if the assigned bridge queue has no data to transfer or is full (e.g., the queue is being used for another pending transaction). If the request is denied, the initiator may repeat the request to complete an ongoing transaction or attempt to start a new one.

Where the request is accepted and a first access is started, the access may be prematurely terminated by the initiator, the target, or the bridge, for various reasons. If this happens, the request may be repeated or a subsequent request may be issued by the initiator to complete the transaction and transfer all of the requested data. Splitting the transaction so that the desired data is transferred in multiple accesses, however, introduces increased overhead in the form of additional accesses having additional idle and address phases. The increased overhead can reduce throughput, where throughput is the amount of data transferred across the bridge per unit time, averaged over a given period. It would be desirable to have a technique that permits an increase in throughput so that the bridge may be tuned to the particular application.

Figure 1:
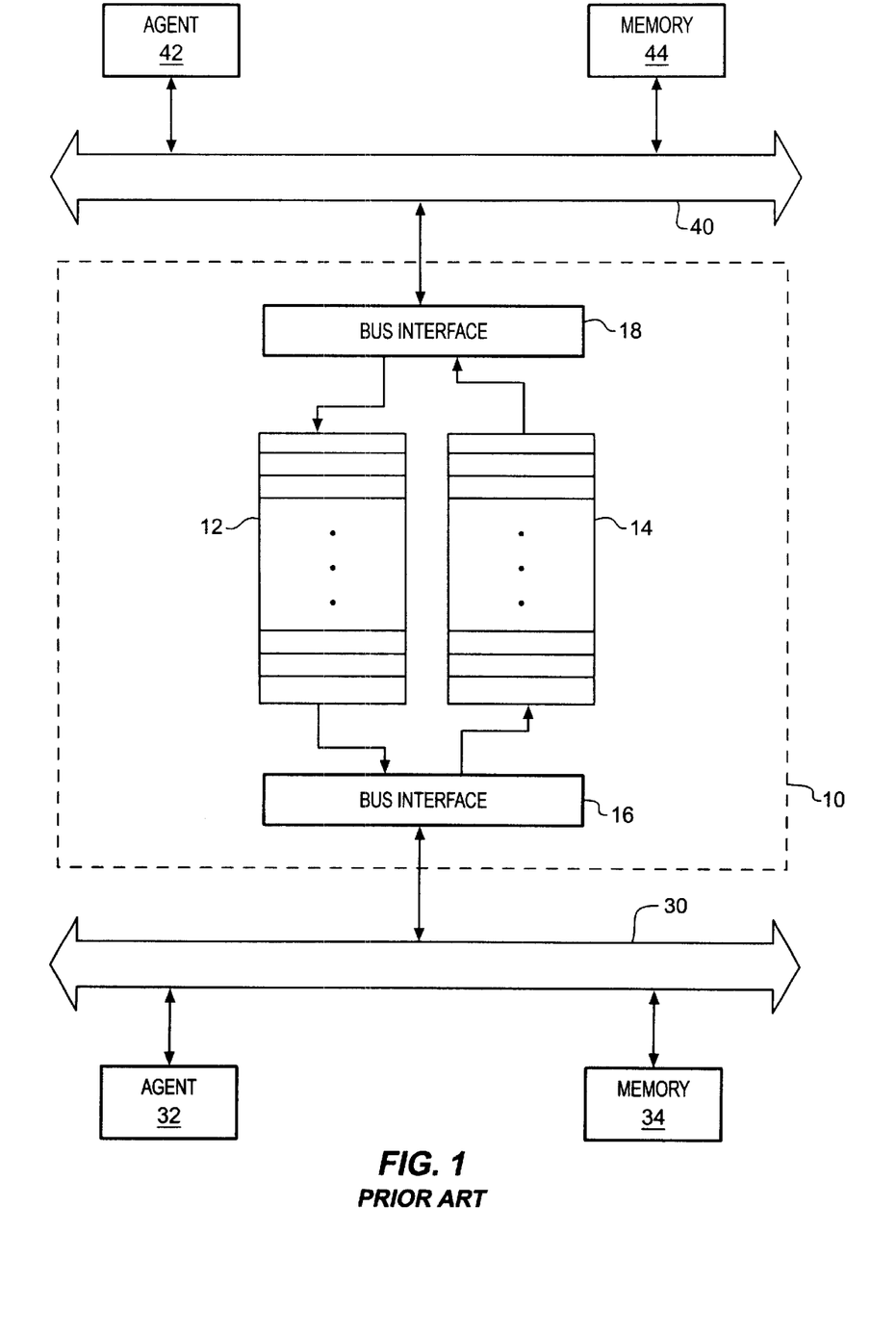
FIG. 1 illustrates a block diagram of a portion of a conventional computer system having two buses separated by a bus bridge.

FIG. 1 illustrates a block diagram of a portion of a conventional computer system having two buses separated by a bus bridge. As shown therein, a bus bridge 10 is coupled between first and second buses 30 and 40. Also coupled to the first bus 30 are a plurality of devices including agent 32 and memory 34. Similarly, coupled to bus 40 are a plurality of devices including agent 42 and memory 44. The bus bridge 10 includes first and second unidirectional data queues 12 and 14, bus interface 16 for interfacing with the first bus 30, and bus interface 18 for interfacing with the second bus 40. The unidirectional data queue 12 is used solely for data transfers from the bus 40 to the bus 30 (i.e., a read by agent 32 from a device on bus 40 or a write by agent 42 to a device on bus 30), which is referred to as an outbound direction. Conversely, the unidirectional data queue 14 is used solely for data transfers from the bus 30 to the bus 40 (i.e., a read by agent 42 from a device on bus 30 or a write by agent 32 to a device on bus 40), which is referred to as an inbound direction.

Read Transaction

For a read, agent 322 initiates a read transaction for data from memory 44. The bridge 10 decodes the address of the transaction and checks at the queue 12 to determine whether the queue 12 has any data. Initially, the data queue 12 is empty and, as a result, the bridge 10 retries the initiator agent 32 indicating that no data is available. The bridge 10 begins filling up the data queue 12 with read data. In the meantime, the initiator agent 32 retries the bridge 10. This time the bridge 10 has data and starts draining the data from the queue 12. There are three conditions where the data transfer is stopped. The first is where there is an error due to any event. The second is where agent 32 is completely satisfied. The third is where the data queue 12 becomes empty (i.e., and under-run condition). If there is an under-run condition, the bridge 10 disconnects the agent 32, The agent 32 then has to initiate a further transaction to retrieve the data from the beginning or from the point where the under-run condition occurred. As can be seen, this reduces the efficiency of the data transfer.

One technique to prevent the queue 12 from becoming empty involves including logic within the bridge 10 to reacquire the bus 40 to maintain data in the data queue 12. From a data movement point of view, this technique is effective. However, from a complexity and silicon point of view, this technique poses a problem. That is, the logic required to prevent the queue 12 from becoming empty is complex and out of proportion to the rest of the logic in the bridge 10. Another problem, is that since the data queue 12 is unidirectional, agent 42 on bus 40 is blocked from initiating any transactions. Moreover, agent 42 is blocked from placing write data in the data queue 12 because the data queue is being used by the read transaction. This further hampers performance.

Write Transaction

For a write, agent 32 initiates a write transaction targeted for memory 44. The bridge 10 decodes the address and indicates to agent 32 that it is ready to receive data (assuming that the queue 14 has sufficient space). As a result, data begins filling the data queue 14. The bridge 10 then initiates a transaction on the bus 40 to write data to memory 44. Once the bridge 10 gets control of bus 40, it transfers data from queue 14 to memory 44. Again, from the point of view of agent 32, this is efficient because its request is being serviced uninterrupted. However, from a system stand point, this technique causes a problem because both buses are tied up, preventing agents hanging off bus 40 from utilizing the bus 40.

Consequently, it is desirable to provide a method and apparatus which overcome the aforementioned drawbacks.

SUMMARY OF THE INVENTION

The present invention comprises a data streaming method and apparatus. In one embodiment, a data streaming method includes detecting a transaction on a first bus that is targeted to a second bus, claiming the transaction to begin filling data in a queue, initiating a further transaction on the second bus to commence draining data from the queue when the first queue is filled up to a threshold value, and terminating the further transaction on the second bus when the queue is substantially empty, while data is filling in the queue from the first bus. One or more subsequent transactions are initiated and terminated on the second bus, as necessary, to drain data from the queue to the second bus when the queue is filled up to the threshold value and/or until the transaction is completed. The second bus operates at a faster speed than the first bus.

DETAILED DESCRIPTION

The present invention comprise a method and apparatus for providing an efficient, low cost data streaming mechanism from a first bus architecture to a second bus architecture across a bus bridge. Separate read and write data queues are provided in the bus bridge for inbound and outbound directions, and the speed of one of these buses is greater than the speed of the other one of the buses. In one embodiment, the first bus is a PCI bus and the second bus us an internal CPU bus.

Figure 2:
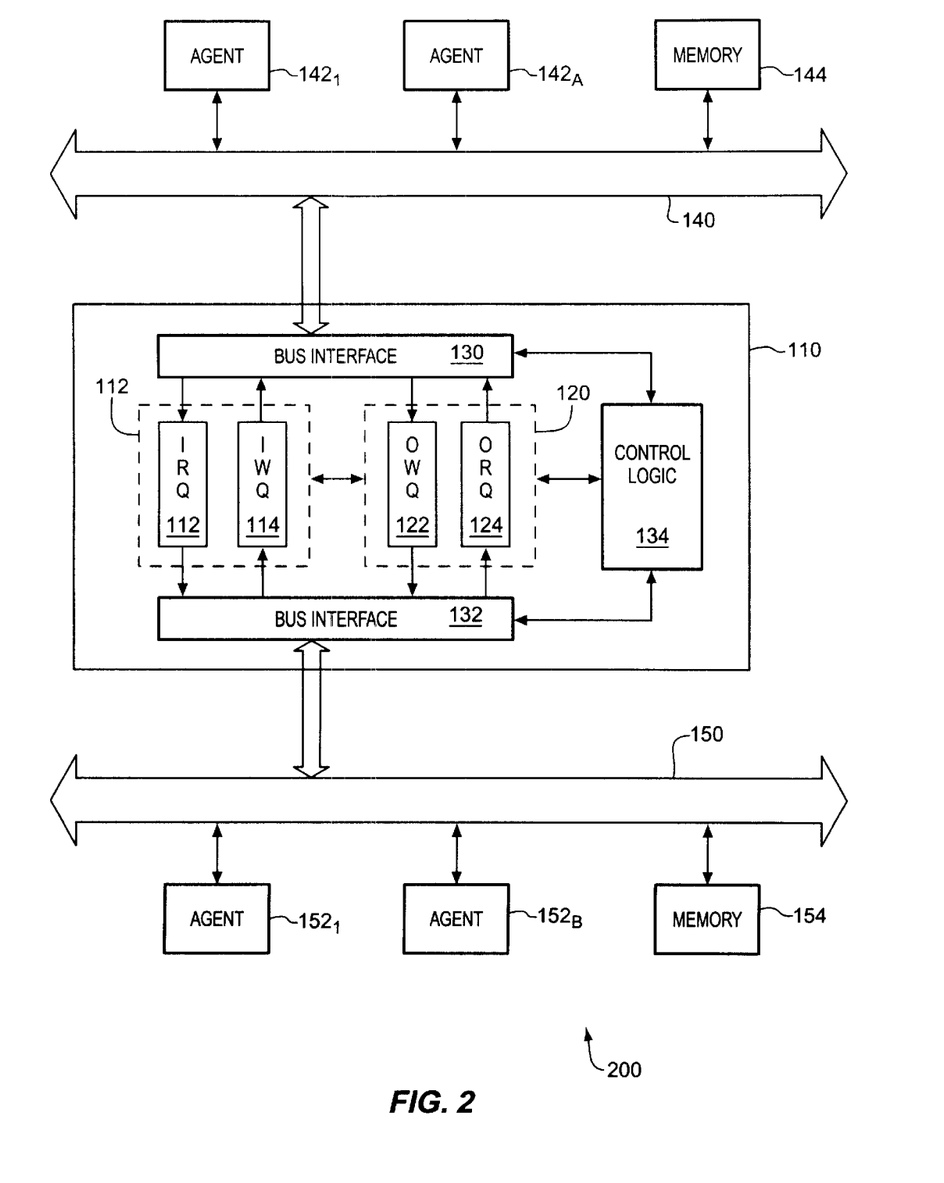
FIG. 2 illustrates a block diagram of a portion of a computer system according to one embodiment of the present invention.

FIG. 2 illustrates a block diagram of a portion of a computer system 200 according to one embodiment of the present invention. Referring to FIG. 2, the computer system 200 includes a bus bridge 110 coupled to a first bus 140 by way of a first bus interface 130, and a second bus 150 by way of a second bus interface 132. Coupled to the first bus 140 are a plurality of agents $142_1$–$142_A$ (where "A" is a positive whole number), and memory 144. Further, coupled to the second bus 150 are a plurality of agents $152_1$–$152_B$ (where "B" is a positive whole number), and memory 154. Agents on the first and/or second buses may include a communication device such as a network card, an input/output controller device for coupling to a mass storage device, a central processing unit (e.g., microprocessor, microcontroller, digital signal processor, etc.), and the like. In one embodiment, the first bus 140 is a core or internal CPU bus whereas the second bus 150 is a PCI bus, although the first and second buses 140 and 150 may adhere to any other type of bus architecture and protocol.

The bridge 110 includes an inbound queue 112 having an inbound write queue ("IWQ") 114 and an inbound read queue ("IRQ") 116, and an outbound queue 120 having a an outbound write queue ("OWQ") 122 and an outbound read queue ("ORQ") 124. Data transfer for a write transaction initiated on bus 150 and targeted to a device on bus 140 across the bus bridge 110 flows through the IWQ 114, whereas data transfer for a write transaction initiated on bus 140 and targeted to a device on bus 150 flows through the OWQ 122. Correspondingly, data transfer for a read transaction initiated on bus 150 and targeted to a device on bus 140 across the bus bridge 110 flows through the IRQ 116, whereas data transfer for a read transaction initiated on bus 140 and targeted to a device on bus 150 flows through the ORQ 124.

Each queue behaves as a FIFO data structure. The depth of each queue is selected such that data transfer efficiency and throughput is maximized. In one embodiment, the depth of each queue is 128 bytes, though the depth may be higher or lower, and may differ from one queue to another. The bridge 110 further includes control logic 134 for controlling the queues and the bus interfaces.

In the embodiment of FIG. 2, separate inbound and outbound read and write queues are provided, allowing for a read request initiated by an agent on bus 150 and targeted for a device on the second bus 140, and a write request initiated by an agent on bus 140 and targeted for a device on bus 150 to occur simultaneously. This provision was not provided for in the prior art mechanism where a write request initiated on bus 140 and targeted to bus 150 was blocked by a previous read request initiated on bus 150 and targeted to bus 140 because of the unidirectional data queues.

Additionally, with the present invention, the speed of the first bus 140 is faster then the speed of the second bus 150. In one embodiment, the speed of the first bus 140 is twice as fast as the speed of the second bus 150.

The combination of separating the data queues and the greater speed of one bus over the other allows for an efficient, low cost data streaming mechanism to be realized, as will be seen in the following sections.

Write Transaction

For a write transaction initiated on bus 150 and targeted to bus 140, the initiator is hereinafter referred to as agent 152, and the target is hereinafter referred to as memory 144. Agent 152 initiates a write request to write data to memory 144 by placing an address of memory 144 on bus 150. The bridge 110 detects the address and claims the transaction. Assuming that the IWQ 114 is not full, the bridge 110 begins filling data in the IWQ 114. Data is placed in the IWQ 114 until a predetermined threshold level is reached or the write data is completed (in the case where the predetermined threshold level is not reached). The predetermined threshold level is also hereinafter referred to as the high watermark. As soon as the high watermark is reached, the bridge 110 initiates a write request on bus 140. After acquiring control of the bus 140, the bridge begins draining the IWQ 114 to memory 144. Since the speed of the bus 140 is faster than the speed of the bus 150, the bridge 110 will likely drain the IWQ 114 before it fills. The high watermark should be set at a value that will ensure or substantially ensure that the IWQ 114 will not be filled before the bridge starts draining data. In one embodiment, in the case where the speed of bus 140 is twice of fast as the speed of bus 150, the high watermark is set at 50% of the IWQ 114 capacity. Generally, the depth of the IWQ 114 and the high watermark should be set at values that take into consideration the latency of acquiring control of bus 140 to maximize efficiency of the system, without causing the IWQ 114 to become filled (e.g., an over-run condition).

Continuing to refer to FIG. 2, once the bridge 110 drains and empties the IWQ 114, the bridge 110 ends the transaction on the bus 140, but continues to fill the IWQ 114 from the transaction on bus 150. The bus 140 is now available for use by other agents or other data transfers. The bridge 110 then reacquires the bus 140 as often as necessary to drain the IWQ 114 to the end of the transaction. The bridge 110 then ends the transaction on the bus 150. From the initiator-master point of view, the streaming of data is uninterrupted and unbroken, thereby maximizing data movement. From the system point of view, agents on the bus 140 are free to acquire the bus 140 in between the bridge 110 acquiring the bus to maximize overall efficiency.

Figure 3:
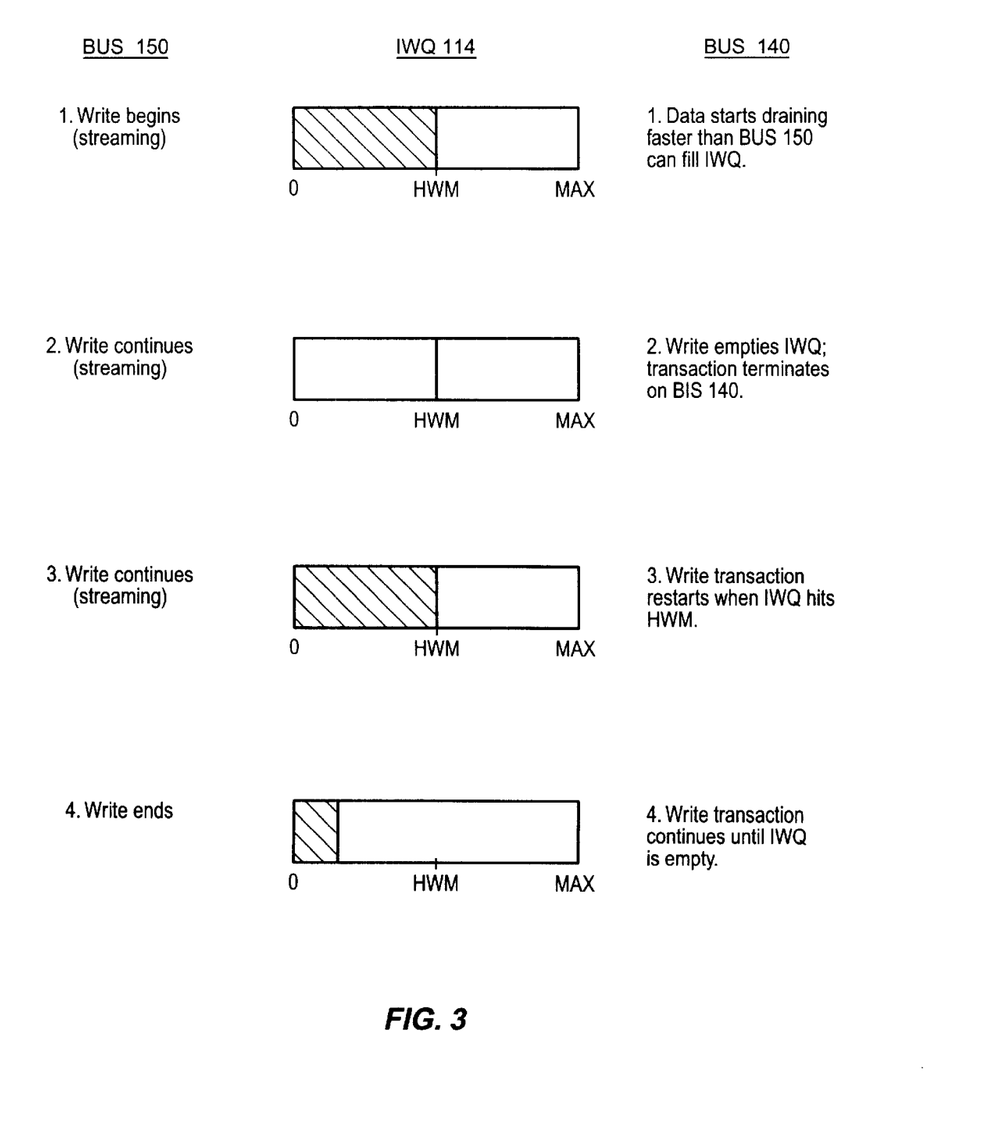
FIG. 3 graphically and sequentially illustrates a data write streaming mechanism according to one embodiment of the present invention.

FIG. 3 graphically and sequentially illustrates a data write streaming mechanism according to one embodiment of the present invention. The bar graphs indicate the current level of the IWQ 114. Referring to FIG. 3, at act 1 on bus 150, a write streaming transaction begins where data is placed in the IWQ 114. At act 1 on the bus 140, after the high watermark ("HWM") is reached, the bridge 110 begins draining data faster than bus 150 can fill the IWQ 114. At act 2 on bus 150, the write streaming continues, whereas at act 2 on bus 140, the write transaction empties the IWQ 114, terminating the transaction on bus 140. At act 3 on the bus 150, the write streaming transaction continues. When the HWM is reached, at act 3 on the bus 140, the bus 140 is reacquired and data is again drained from the IWQ 114. Note that at act 3 on bus 150, an end of write streaming transaction also triggers a further write transaction on bus 140 (in the case where the HWM is not reached). At act 4 on bus 150, the write transaction ends. Finally, at act 4 on bus 140, the write transaction continues until the IWQ 114 is empty.

Read Transaction

For a read initiated on bus 150 and targeted to bus 140, agent 152 initiates a read transaction to read data from memory 144 by placing an address of memory 144 on bus 150. The bridge 110 detects the address and claims the transaction. The bridge 110 then indicates to the agent 152 to retry the read transaction (since the bridge 110 has not yet placed data in the IRQ 116), while capturing in the address and command for issuing on the bus 140. The bridge then acquires the bus 140 and begins filling up the IRQ 116 with data. Once a predetermined threshold is reached (i.e., low watermark, "LWM"), the bridge 110 claims the retried read transaction on bus 150. The low watermark ensures that the bridge 110 does not empty after one data transfer. In one embodiment, the low watermark is set at 50% of the depth of the IRQ 116, though it may be set at any percentage. Moreover, the bridge 110, which is being filled faster than it is emptied, can return data to the agent 152 until the IRQ 116 fills. Once this occurs, the bridge 110 no longer tries to acquire more data from memory 144 and relinquishes the bus 140 for use by other agents. Once the agent 152 drains the IRQ 116, the bridge 110 disconnects the agent 152, forcing it to initiate a further read request if more data is desired.

By selecting the depth of the IRQ 116, and determining the typical amount of data transfer for a read transaction, the number of retries can be minimized, thereby maximizing overall system efficiency. From the initiator agent point of view, the streaming of data is uninterrupted and unbroken. From a system point of view, agents on the bus 140 are free to acquire the bus 140 after the bridge 110 relinquishes the bus.

Figure 4:
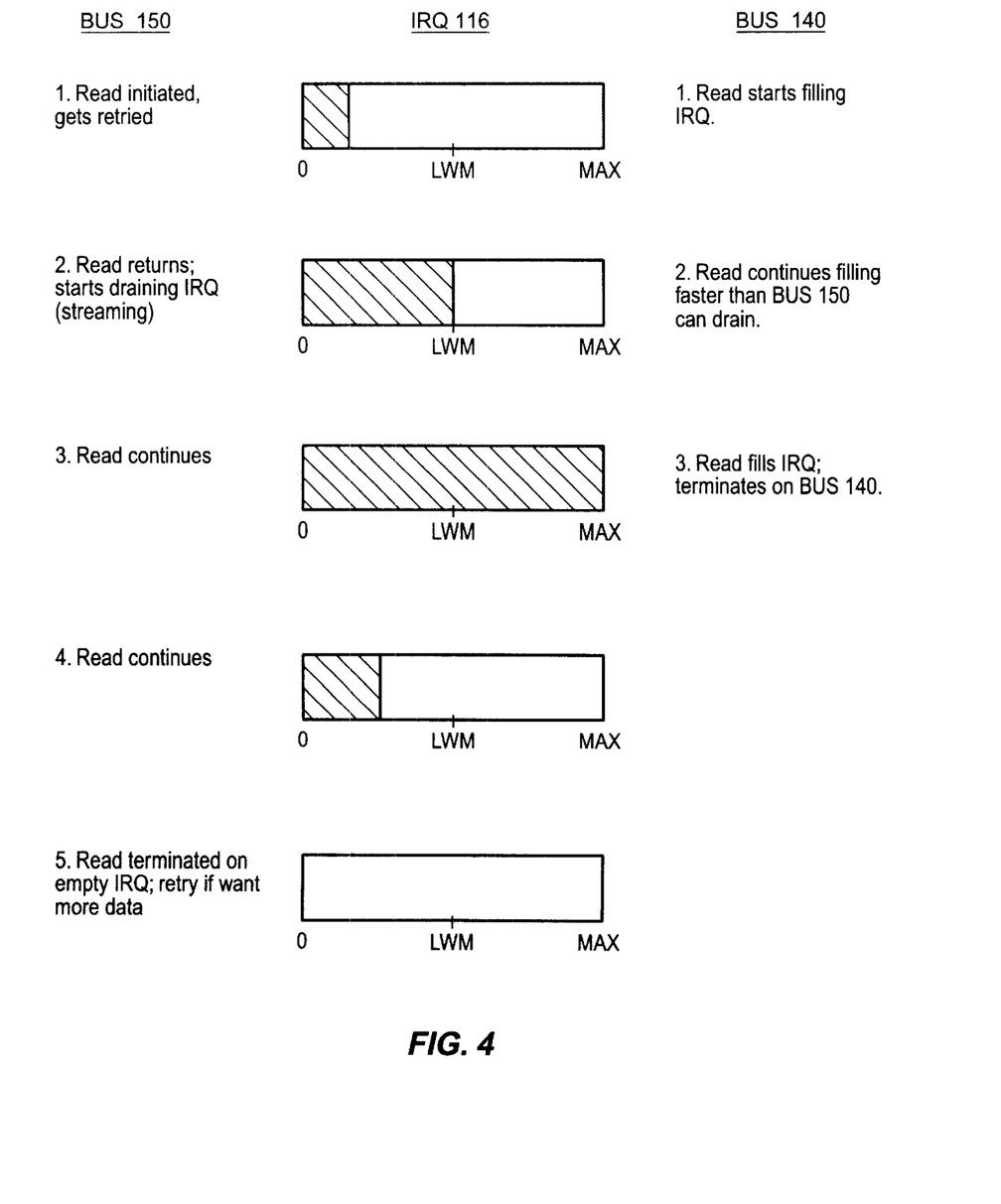
FIG. 4 graphically and sequentially illustrates a data read streaming mechanism according to one embodiment of the present invention.

FIG. 4 graphically and sequentially illustrates a data read streaming mechanism according to one embodiment of the present invention. The bar graphs indicate the current level of the IRQ 116. Referring to FIG. 4, at act 1 on bus 150, a read streaming transaction is initiated by an agent, and the bridge 110 retries the agent. At act 1 on the bus 140, the bridge 110 acquires control of bus 140 and begins to fill the IRQ 116. At act 2 on bus 150, the agent 152 continues to get retried by the bridge 110 until the IRQ 116 is filled up to the LWM, at which time the bridge 110 grants the request to the agent 152 and begins draining the IRQ 116. At act 2 on bus 140, data is placed in the IRQ 116 faster than it is drained on bus 150. At act 3 on the bus 150, the read streaming transaction continues and data is drained from the IRQ 116. At act 3 on the bus 140, the bridge 110 terminates the read transaction on bus 140 when the IRQ 116 is filled with data. At act 4 on bus 150, the read transaction continues and data is drained from the IRQ 116. Finally, at act 5 on bus 150, the read transaction terminates when the IRQ 116 is empty. If the agent 152 desires more data from memory 144, the agent 152 retries the transaction to acquire more data. However, this is not a frequent event as the agent 152 will be completely satisfied most of the time.

The provision of keeping the bus 140 occupied until the entire read transaction is completed on bus 150 is at an additional penalty since the bus 140 is not free for other agents. This mechanism provides a tradeoff between maximum usage of the bus 140 against occasional under-run conditions of the IRQ 116.

Figure 5:
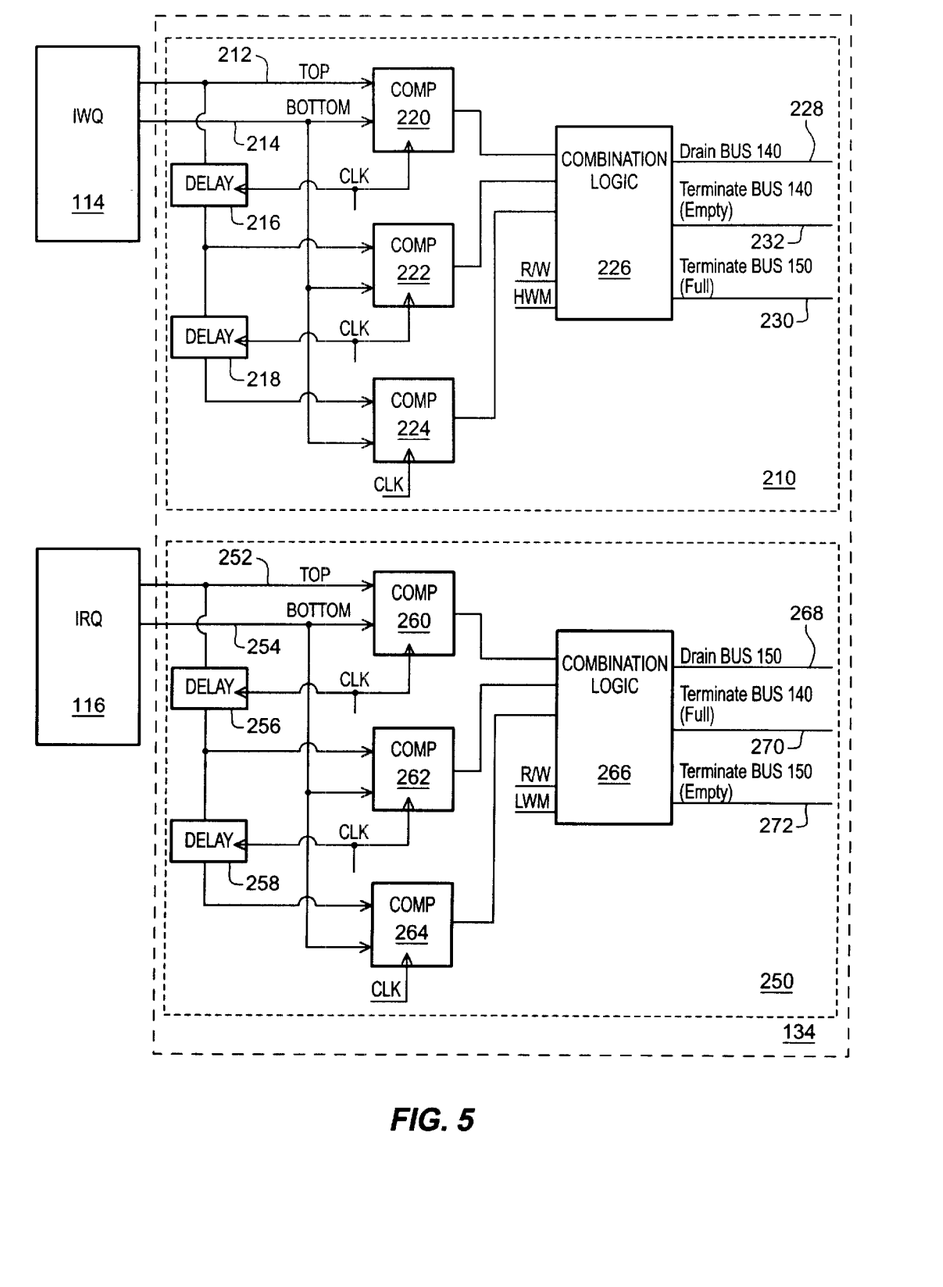
FIG. 5 illustrates a portion of the control logic of FIG. 2 according to one embodiment of the present invention.

FIG. 5 illustrates a portion of the control logic 134 of FIG. 2 according to one embodiment of the present invention. It should be noted that only the portion(s) of the control logic 134 relevant to embodiments of the present invention are shown, namely control logic related to the inbound queue 112.

Referring to FIG. 5, the control logic 134 includes write logic 210 relating to the IWQ 114, and read logic 250 relating to the IRQ 116. Write logic 210 includes top and bottom pointers, hereinafter references by numerals 212 and 214, respectively, which point to the IWQ 114. More specifically, each time data is clocked in the IWQ 114, the top pointer 212 is incremented, and each time data is clocked out of the IWQ 114, the bottom 214 pointer is incremented.

The IWQ 114 is treated as a circular buffer, such that the pointers wrap around from the bottom to the top of the IWQ 114. The bottom pointer 214 is fed into comparators 220, 222, and 224. The top pointer 212 is fed into comparator 220, comparator 222 through a first delay circuit 216, and comparator 224 through the first delay circuit 216 and a second delay circuit 218. The purpose of the delay circuits 216 and 218, and comparators 222 and 224 is to provide a look forward mechanism so that if the IWQ 114 is about to go full, the device providing data into the IWQ 114 can be stopped. In this embodiment, the top pointer 212 can be compared to the bottom pointer 214 up to two clocks ahead of time.

The output of comparators 220, 222, and 224 are fed to a combination logic 226. Also coupled to the combination logic 226 is a read/write signal generated by an initiator on bus 150 and forwarded by the bus interface 132, and the HWM value that is loaded from a memory location or programmable register contained within the bridge 110 (not shown). The combination logic 226 compares the HWM value with the depth of the IWQ 114 (difference between the top and bottom pointers 212 and 214 output by, for example, comparator 224). If the depth of the IWQ 114 reaches the HWM value or the write transaction is terminated before such event, the combination logic 226 asserts a drain signal on signal line 228, which is fed to the bus interface 130. The bus interface 130 then requests acquisition of the bus 140 to drain the IWQ 114. When the IWQ 114 becomes empty (e.g., the output of comparator 224 becomes zero), the combination logic 226 asserts a terminate bus signal on signal line 230, which is also coupled to the bus interface 130. In response, the bus interface 130 terminates the transaction and relinquished control of bus 140. If, however, the IWQ 114 becomes full (e.g., the output of comparator 224 is substantially equal to the maximum capacity of the IWQ 114), the combination logic 226 asserts a terminate bus signal on signal line 232, which is coupled to the bus interface 132. In response, the bus interface 132 terminates the transaction on bus 150, preventing a data over-run condition in the IWQ 114. As can be seen, the control logic is substantially simplified using the data streaming mechanism of the present invention.

Continuing to refer to FIG. 5, the read logic 250 includes top and bottom pointers, hereinafter references by numerals 252 and 254, respectively, which point to the IRQ 116. Similar to the IWQ 114, each time data is clocked in the IRQ 116, the top pointer 252 is incremented, and each time data is clocked out of the IRQ 116, the bottom pointer 254 is incremented. The IRQ 116 is treated as a circular buffer, such that the pointers wrap around from the bottom to the top of the IRQ 116. The read logic 250 has a similar look ahead circuit as the write logic 210. The look ahead circuit includes delay circuits: 256 and 258, and comparators 260, 262, and 264.

The output of comparators 260, 262, and 264 are fed to a combination logic 266. Also coupled to the combination logic 266 is a read/write signal generated by an initiator on bus 150 and forwarded by the bus interface 132, and the LWM value which is loaded from a memory location or programmable register contained within the bridge 110 (not shown). The combination logic 266 compares the LWM value with the depth of the IRQ 116 (difference between the top and bottom pointers 252 and 254 output by, for example, comparator 264). If the depth of the IRQ 116 reaches the LWM value or the read transaction is terminated before such event, the combination logic 266 asserts a drain signal on signal line 268, which is fed to the bus interface 132. The bus interface 132 then claims the transaction to drain the IRQ 116, in response to a read request by an agent on bus 150 for the data in the IRQ 116. When the IRQ 116 becomes full (e.g., the output of comparator 264 is substantially equal to the maximum capacity of the IRQ 116), the combination logic 266 asserts a terminate bus signal on signal line 270, which is coupled to the bus interface 130. In response, the bus interface 130 terminates the transaction on bus 140, preventing a data over-run condition in the IRQ 116. When the IRQ 116 becomes empty (e.g., the output of comparator 264 becomes zero), the combination logic 266 asserts a terminate bus signal on signal line 272, which is coupled to the bus interface 132. In response, the bus interface 132 terminates the transaction.

By utilizing the above implementation, complex logic in the bridge 110 is minimized. The bridge 110 avoids sticky logic and boundary conditions by not reacquiring the bus 140 after it has terminated a read. The read by an agent on the bus 150 can terminate at any time, including just before, during, or after the bridge 110 begins refilling the IRQ 116 (if it were to reacquire the bus 140). These conditions are rife with lockup possibilities which the present invention bypasses completely. For the same reason, the bridge 110 does not attempt to insert wait states on the bus 140 to retain ownership of the bus 140 to maintain a write stream. Instead, the present invention takes advantage of the natural frequency mismatch between the buses 140 and 150 to maximize both bus utilization on bus 140 and opportunity for data streaming. Furthermore, validation time and silicon area are minimized by avoiding expensive solutions such as PCI bus wait-state throttling and read re-acquisition.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for data streaming comprising:
   a) detecting a write transaction on a first bus that is targeted to a second bus, wherein the second bus is operating at a faster speed than the first bus;
   b) claiming the write transaction to begin filling data in a queue;
   c) facilitating the write transaction on the first bus to continue uninterrupted by initiating a second transaction on the second bus to commence draining data from the queue when the queue is filled up to a threshold value;
   d) terminating the second transaction on the second bus when the queue is substantially empty while data is filling in the queue from the first bus; and
   e) repeating c) and d) until the write transaction is completed.

2. The data streaming method of claim 1 wherein detecting the write transaction on the first bus that is targeted to the second bus comprises detecting the write transaction initiated by a first device on the first bus that is targeted to a second device on the second bus.

3. The data streaming method of claim 1 wherein the first bus is a peripheral component interconnect bus.

4. The data streaming method of claim 3 wherein the second bus is a processor core bus.

5. A method for data streaming comprising:
   a) detecting a read transaction on a first bus that is targeted to a second bus, wherein the second bus is operating at a faster speed than the first bus;

b) initiating a second transaction on the second bus to fill the queue;
c) claiming the read transaction in the first bus to drain data from the queue when the queue is filled up to a threshold value;
d) terminating the second transaction on the second bus when the queue is substantially full until data is substantially drained from the queue; and
e) repeating b) and d) until the read transaction is completed.

6. The data streaming method of claim 5 wherein initiating the second transaction on the second bus to fill queue comprises initiating a read transaction on the second bus to fill data in the queue.

7. The data streaming method of claim 5 wherein the first bus is a peripheral component interconnect bus.

8. The data streaming method of claim 7 wherein the second bus is a processor core bus.

9. A computer system, comprising:
a first bus operating at a first speed;
and second bus operating at a second speed, said second bus operating at a faster rate than said first speed; and
a bus bridge including,
a first queue,
first and second bus interfaces coupled to the first and second buses, respectively, and
control logic coupled to the first queue, and first and second bus interfaces, the control logic to fill data in the first queue upon the bus bridge claiming a first transaction initiated on the first bus that is targeted to a device on a the second bus, to initiate a second transaction on the second bus to drain data from the first queue when the first queue is filled up to a predetermined threshold value, and to terminate the second transaction on the second bus when the first queue is substantially empty, while data is being filled in the first queue from the first bus.

10. The computer system of claim 9 wherein the first bus is a peripheral component interconnect bus.

11. The computer system of claim 9 wherein the second bus is a central processing unit bus.

12. The computer system of claim 9 wherein the second bus operates twice as fast as the first bus.

13. The computer system of claim 9 wherein the first queue is 128 bytes in depth.

14. The computer system of claim 9 wherein the predetermined threshold value is equal to one-half the size of the first queue.

15. The computer system of claim 9 wherein the bus bridge further comprises a second queue coupled to the controlled logic and the first and second bus interfaces, the bus bridge to (i) detect a read transaction request on the first bus that is targeted to the second bus, (ii) initiate a transaction on the second bus to fill data in the second queue, (iii) claim the read transaction on the first bus to drain data from the second queue when a second predetermined threshold value is reached, (iv) terminating the transaction on the second bus when the second queue is substantially full, while data is draining from the second queue to the first bus.

16. The computer system of claim 15 wherein the second queue is 128 bytes in depth.

17. The computer system of claim 15 wherein the second predetermined threshold is equal to one-half the size of the second queue.

18. A machine-readable medium having stored thereon data representing sequences of instructions, the sequences of instructions which, when executed by a processor, cause the processor to stream data between a first bus and a second bus by:
a) detecting a transaction on the first bus that is targeted to the second bus wherein the second bus is operating at a faster speed than the first bus;
b) claiming the transaction to begin filling data in a queue;
c) initiating a further transaction on the second bus to commence draining data from the queue when the queues filled up to a predetermined threshold value;
d) terminating the further transaction on the second bus when the queue is substantially empty while data is filling in the queue from the first bus; and
e) repeating c) and d) until the transaction is completed.

19. The machine-readable medium of claim 18 wherein detecting the transaction on the first bus that is targeted to the second bus comprises detecting the transaction initiated by a first device on the first bus that is targeted to a second device on the second bus.

20. The machine-readable medium of claim 18 wherein initiating the further transaction on the second bus to commence draining data from the queue comprises initiating the further transaction on the second bus to commence draining data from the queue to a second device when the first queue is filled up to the predetermined threshold value.

21. The machine-readable medium of claim 18 wherein detecting the transaction on the first bus that is targeted to the second bus comprises detecting a write transaction on the first bus that is targeted to the second bus.

22. The machine-readable medium of claim 18 wherein the first bus is a peripheral component interconnect bus.

23. The machine-readable medium of claim 22 wherein the second bus is a processor core bus.

24. A machine-readable medium having stored thereon data representing sequences of instructions, the sequences of instructions which, when executed by a processor, cause the processor to stream data between a first bus and a second bus by:
a) detecting a first transaction on the first bus that is targeted to the second bus wherein the second bus is operating at a faster speed than the first bus;
b) initiating a second transaction on the second bus to fill the queue;
c) claiming the first transaction in the first bus to drain data from the queue when the queue is filled up to a predetermined threshold value;
d) terminating the second transaction on the second bus when the queue is substantially full until data is substantially drained from the queue; and
e) repeating b) and d) until the first transaction is completed.

25. The machine-readable medium of claim 24 wherein detecting the first transaction on the first bus that is targeted to the second bus comprises detecting a read transaction initiated by a first device on the first bus that is targeted to a second device on the second bus.

26. The machine-readable medium of claim 24 wherein initiating the second transaction on the second bus to fill queue comprises initiating a read transaction on the second bus to fill data in the queue.

27. The machine-readable medium of claim 24 wherein the first bus is a peripheral component interconnect bus.

28. The machine-readable medium of claim 27 wherein the second bus is a processor core bus.

29. A bus bridge comprising:
a first interface connected with a first bus;
a second interface connected with a second bus wherein said second bus operates at a speed higher than said first bus;
a unidirectional inbound read queue connected with the first interface and the second interface;
a unidirectional inbound write queue connected with the first interface and the second interface;
a unidirectional outbound read queue connected with the first interface and the second interface;
a unidirectional outbound write queue connected with the first interface and the second interface; and
control logic connected with the first interface, the second interface, the inbound read queue, the inbound write queue, the outbound read queue, and the outbound write queue wherein the control logic causes said bus bridge to
  a) detect a transaction on the first bus that is targeted to the second bus,
  b) claim the transaction to begin filling data in the inbound write queue,
  c) initiate a further transaction on the second bus to commence draining data from the inbound write queue when the queue fills up to a predetermined threshold value,
  d) terminate the further transaction on the second bus when the inbound write queue is substantially empty while data is filling in the inbound write queue from the first bus, and
  e) repeat c) and d) until the transaction is completed.

30. The bus bridge of claim 29 wherein said control logic detects the transaction on the first bus that is targeted to the second bus by detecting the transaction initiated by a first device on the first bus that is targeted to a second device on the second bus.

31. The bus bridge of claim 29 wherein said control logic initiates the further transaction on the second bus to commence draining data from the queue by initiating the further transaction on the second bus to commence draining data from the queue to a second device when the first queue is filled up to the predetermined threshold value.

32. The bus bridge of claim 29 wherein said control logic detects the transaction on the first bus that is targeted to the second bus by detecting a write transaction on the first bus that is targeted to the second bus.

33. The bus bridge of claim 29 wherein the firs t bus is a peripheral component interconnect bus.

34. The bus bridge of claim 33 wherein the second bus is a processor core bus.

35. A bus bridge comprising:
a first interface connected with a first bus;
a second interface connected with a second bus wherein said second bus operates at a speed higher than said first bus;
a unidirectional inbound read queue connected with the first interface and the second interface;
a unidirectional inbound write queue connected with the first interface and the second interface;
a unidirectional outbound read queue connected with the first interface and the second interface;
a unidirectional outbound write queue connected with the first interface and the second interface; and
control logic connected with the first interface, the second interface, the inbound read queue, the inbound write queue, the outbound read queue, and the outbound write queue wherein the control logic causes said bus bridge to
  a) detect a first transaction on the first bus that is targeted to the second bus,
  b) initiate a second transaction on the second bus to fill the inbound read queue,
  c) claim the first transaction in the first bus to drain data from the inbound read queue when the inbound read queue is filled up to a predetermined threshold value,
  d) terminate the second transaction on the second bus when the inbound read queue is substantially full until data is substantially drained from the inbound read queue, and
  e) repeat b) and d) until the first transaction is completed.

36. The bus bridge of claim 35 wherein the control logic detects the first transaction on the first bus that is targeted to the second bus by detecting a read transaction initiated by a first device on the first bus that is targeted to a second device on the second bus.

37. The bus bridge of claim 35 wherein the control logic initiates the second transaction on the second bus to fill queue by initiating a read transaction on the second bus to fill data in the queue.

38. The bus bridge of claim 35 wherein the first bus is a peripheral component interconnect bus.

39. The bus bridge of claim 38 wherein the second bus is a processor core bus.

* * * * *

UNITED STATES PATENT AND TRADEMARK OFFICE
CERTIFICATE OF CORRECTION

PATENT NO.    : 6,460,108 B1
DATED         : October 1, 2002
INVENTOR(S)   : McCoskey et al.

Page 1 of 1

It is certified that error appears in the above-identified patent and that said Letters Patent is hereby corrected as shown below:

<u>Column 4,</u>
Line 3, delete "us", insert -- is --.

Signed and Sealed this

Twenty-fifth Day of February, 2003

JAMES E. ROGAN
*Director of the United States Patent and Trademark Office*